United States Patent
Matsuda (10) Patent No.: US 8,233,164 B2
(45) Date of Patent: Jul. 31, 2012

(54) RENDERING APPARATUS, RENDERING METHOD, AND COMPUTER-READABLE STORAGE MEDIUM

(75) Inventor: Hiroshi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 12/329,355

(22) Filed: Dec. 5, 2008

(65) Prior Publication Data

US 2009/0147288 A1 Jun. 11, 2009

(30) Foreign Application Priority Data

Dec. 7, 2007 (JP) ................................ 2007-316808

(51) Int. Cl.
*G06F 12/02* (2006.01)
*G06F 3/12* (2006.01)
*H04N 1/40* (2006.01)
*G06K 15/00* (2006.01)

(52) U.S. Cl. ....... 358/1.13; 358/1.16; 358/444; 345/543

(58) Field of Classification Search ................. 358/1.13, 358/1.16, 444; 345/422, 582, 467, 530, 508, 345/511, 523, 435, 433, 428, 543, 544, 545, 345/546, 547, 548, 549, 550, 551, 552, 553, 345/554

See application file for complete search history.

(56) References Cited

U.S. PATENT DOCUMENTS

| 5,870,085 | A | * | 2/1999 | Laksono ....................... 345/551 |
| 7,889,205 | B1 | * | 2/2011 | Parenteau et al. ............. 345/545 |
| 2004/0179824 | A1 | * | 9/2004 | Tsumagari et al. ........... 386/109 |
| 2008/0036763 | A1 | * | 2/2008 | Chen et al. .................... 345/422 |
| 2009/0147288 | A1 | * | 6/2009 | Matsuda ........................ 358/1.9 |

FOREIGN PATENT DOCUMENTS

| EP | 1420575 A1 | 5/2004 |
| JP | 2000335022 A | 12/2000 |
| JP | 2004110337 A | 4/2004 |
| JP | 2006-172203 A | 6/2006 |

* cited by examiner

*Primary Examiner* — Jerome Grant, II
(74) *Attorney, Agent, or Firm* — Canon USA Inc. IP Division (57) ABSTRACT

It is determined whether the rasterization result of a rendering object is cashed. If it is determined that the rasterization result of the rendering object is not cashed, an image and a mask for the image are generated from the rendering object. The generated image and the generated mask are stored in a cache. If it is determined that the rasterization result of the rendering object is cached, an image and a mask are extracted from the cache. The extracted image is rendered on a portion of the extracted mask so that a background image remains on a portion other than the portion of the extracted mask.

22 Claims, 10 Drawing Sheets

RENDERING APPARATUS, RENDERING METHOD, AND COMPUTER-READABLE STORAGE MEDIUM

BACKGROUND OF THE INVENTION

1. Field of the Invention

The present invention relates to a rendering apparatus and a rendering method for effectively processing a common rendering object included in an electronic document, and a computer-readable storage medium.

2. Description of the Related Art

With the development of digital printing, variable data printing capitalizing on the features of such digital printing has attracted widespread attention. Variable data printing is a printing method of setting part of print data as variable data and changing the variable data for each sheet, and can make full use of the capabilities of digital printers for printing, for example, electrophotographs. In the variable data printing, although various VDP languages are used, the standardization of VDP languages has been achieved. PPML has been defined as a standard VDP language and the increasingly widespread use of PPML is expected. In PPML, elements used for page rendering include a reusable object assumed to be repeatedly used and a local object assumed to be used only once. The reusable object is used in a case that the same image is rendered on a plurality of portions using the same source rendering data regardless of whether these portions are included in the same page or different pages, or whether the printing of the image on these portions is instructed by different jobs. In the case of rendering objects such as the local object and the reusable object, PostScript® data or PDF data is used as source rendering data. The source rendering data is subjected to RIP processing to generate a raster image and the generated raster image is placed on a page. If it is certain that source rendering data will be reused like a PPML reusable object, a raster image obtained by performing RIP processing upon the source rendering data is cached. This achieves very high-speed rendering processing. However, if the raster image is a high-resolution and high-gradation color image, the data volume of the raster image becomes extremely large. Large amounts of memory are therefore required. Accordingly, a method of generating intermediate data from source rendering data prior to conversion of the source rendering data into a raster image and caching the intermediate data can be considered. This method requires time necessary to perform RIP processing, but can markedly reduce the amount of memory required for caching. Accordingly, the method is a compromise balancing the amount of memory and performance.

There is a PDL (Page Description Language) having a concept of a "form" similar to the above-described concept. However, it is relatively difficult to generate a form to be reused in a plurality of portions using PDL generation software such as a general printer driver. Detecting of a commonality between rendering objects at the time of first data scanning and generating of PDL data at the time of second data scanning are required. That is, a two-path configuration is required. Alternatively, a method of detecting in an application a commonality between rendering objects or a method of making user specify a commonality between rendering objects can be considered. On the other hand, in VDP, a commonality between pieces of rendering data is generally specified using a dedicated editing application. Accordingly, print data such as reusable object data or common form data having optimal characteristics for VDP can be easily generated. It is therefore desirable that a specialized application for VDP and a printer capable of processing a VDP language such as PPML be used together.

A preflight technique for checking a VDP document described in, for example, PPML is disclosed in which a background object serving as a common object and a foreground object unique to each page are extracted from the VDP document and overlapping of these objects at the time of printing is checked (Japanese Patent Laid-Open No. 2006-172203).

As described previously, by caching raster image data obtained by performing RIP processing upon a reusable object, the RIP processing time can be markedly reduced. However, even if RIPped raster image data is cached, correct rendering may not be performed. In the case of PPML, a plurality of rendering objects including a reusable object are allowed to overlap each other. In an area where these rendering objects overlap, if there is a part of the area in which a foreground rendering object is not rendered, a background object is required to remain in the part of the area. However, in the case of simple raster image data, an area in which rendering is performed using a rendering object cannot be distinguished from an area in which rendering is not performed. Raster image data is composed of pieces of gradation information about the color density or luminance of pixels. Accordingly, it is impossible to specify whether to paint each pixel.

The detailed description will be made with reference to FIGS. 8A and 8B. In a background page 3801, a text object 3804 is placed. In a foreground page 3802, a graphic object 3805 having a bounding box surrounded by a broken line is placed. An image 3803 represents an expected combination result. Referring to FIG. 8B, an image 3809 represents the result of simple combination in which the background portion of the graphic object is painted white. An image 3810 represents an image obtained by rendering the graphic object and binarizing the rendered graphic image. At this point, a portion to be painted white and a portion not to be painted are not distinguished from each other. Accordingly, if these objects are simply combined, the background portion of the graphic object is painted white.

SUMMARY OF THE INVENTION

The present invention provides a rendering apparatus including: a cache determination unit configured to determine whether a rasterization result of a rendering object is cached; a cache unit configured to, in a case that the cache determination unit determines that the rasterization result of the rendering object is not cached, generate an image and a mask for the image from the rendering object and store the generated image and the generated mask in a cache; and a rendering unit configured to, in a case that the cache determination unit determines that the rasterization result of the rendering object is cached, extract an image and a mask from the cache and render the extracted image on a portion of the extracted mask so that a background image remains on a portion other than the portion of the mask.

The present invention provides a rendering method including: determining whether a rasterization result of a rendering object is cached; in a case that it is determined that the rasterization result of the rendering object is not cached, generating an image and a mask for the image from the rendering object and storing the generated image and the generated mask in a cache; and in a case that it is determined that the rasterization result of the rendering object is cached, extracting an image and a mask from the cache and rendering the extracted image on a portion of the extracted mask so that a background image remains on a portion other than the portion of the mask.

The present invention provides a computer-readable storage medium storing a program for causing a rendering apparatus to perform a method including: determining whether a rasterization result of a rendering object is cached; in a case that it is determined that the rasterization result of the rendering object is not cached, generating an image and a mask for the image from the rendering object and storing the generated image and the generated mask in a cache; and in a case that it is determined that the rasterization result of the rendering object is cached, extracting an image and a mask from the cache and rendering the extracted image on a portion of the extracted mask so that a background image remains on a portion other than the portion of the mask.

The present invention provides a print apparatus including: a cache determination unit configured to determine whether a rasterization result of a rendering object is cached; a cache unit configured to, in a case that the cache determination unit determines that the rasterization result of the rendering object is not cached, generate an image and a mask for the image from the rendering object and store the generated image and the generated mask in a cache; a rendering unit configured to, in a case that the cache determination unit determines that the rasterization result of the rendering object is cached, extract an image and a mask from the cache and render the extracted image on a portion of the extracted mask so that a background image remains on a portion other than the portion of the mask; and a print unit configured to print an image rendered by the rendering unit.

Further features of the present invention will become apparent from the following description of exemplary embodiments with reference to the attached drawings.

DESCRIPTION OF THE EMBODIMENTS

An embodiment of the present invention will be described in detail below with reference to the accompanying drawings.

Figure 1:
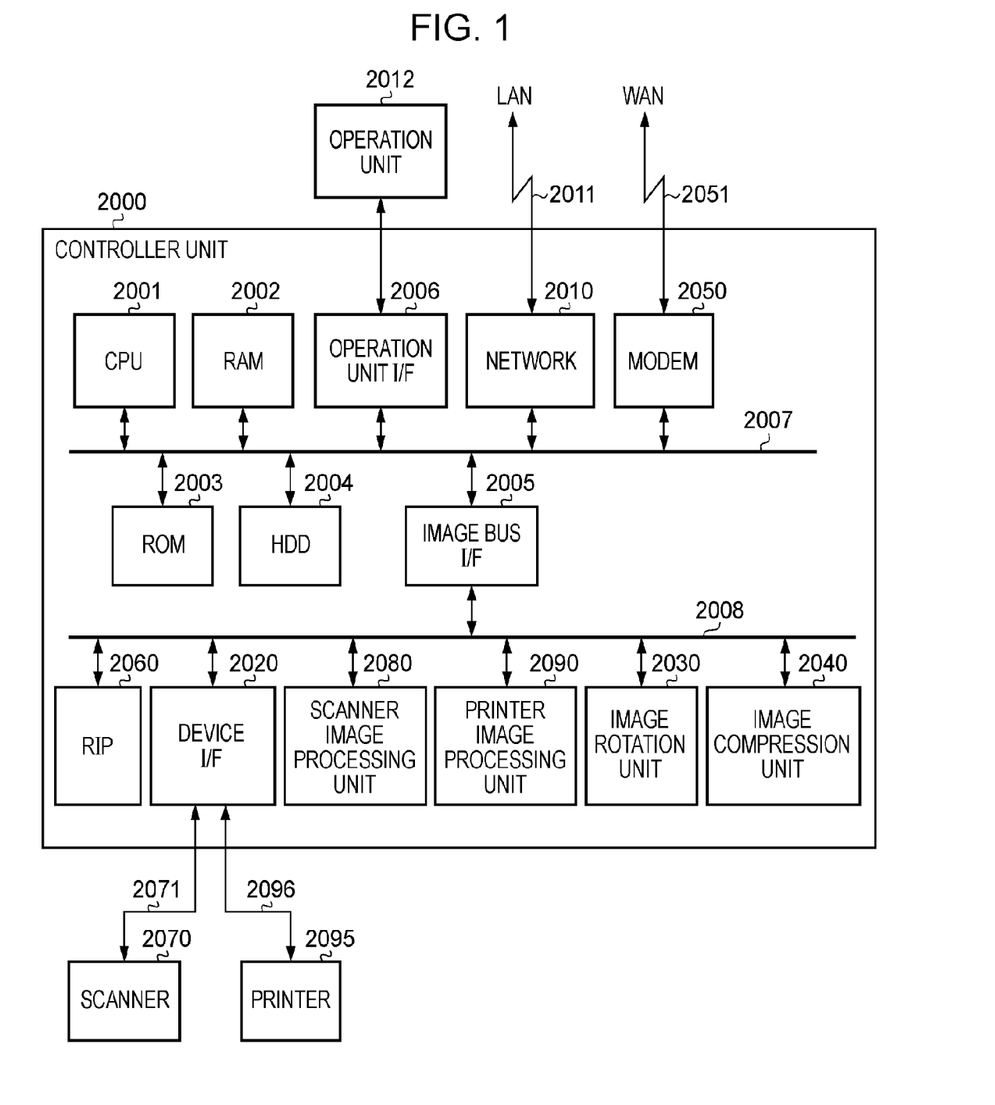
FIG. 1 is a diagram illustrating the configuration of a controller unit included in a rendering apparatus.

FIG. 1 is a block diagram describing the configuration of a rendering apparatus. A controller unit 2000 is a controller for receiving/outputting image information and device information. The controller unit 2000 is connected to a scanner 2070 that is an image input device, a printer 2095 that is an image output device, a LAN 2011, and a public communication line (WAN) 2051. A RAM 2002 is a system work memory used for the operation of a CPU 2001. The RAM 2002 also functions as an image memory for temporarily storing image data. A ROM 2003 is a boot ROM, and stores a boot program for a system. An HDD 2004 is a hard disk drive for storing system software and image data. An operation unit I/F 2006 functions as an interface unit between an operation unit (UI) 2012 and the controller unit 2000, and outputs to the operation unit 2012 data of an image to be displayed on the operation unit 2012.

The operation unit I/F 2006 also transmits to the CPU 2001 information input from the operation unit 2012 by the user of this system. A network 2010 is connected to the LAN 2011 so as to receive/output information. A modem 2050 is connected to the public communication line 2051 so as to receive/output information. The above-described devices are disposed on a system bus 2007. An image bus I/F 2005 is a bus bridge for connecting an image bus 2008 for transferring image data at high speeds and the system bus 2007 so as to transform a data structure. The image bus 2008 is a PCI bus or an IEEE 1394 bus. On the image bus 2008, the following devices are disposed. An image processor (RIP) 2060 expands a display list into a raster image. A device I/F 2020 connects the scanner 2070 and the printer 2095, which are an image input device and an image output device, respectively, to the controller unit 2000 so as to perform synchronous-to-asynchronous or asynchronous-to-synchronous conversion of image data. A scanner image processing unit 2080 corrects, processes, and edits input image data. A printer image processing unit 2090 performs correction, resolution conversion, halftoning, etc. upon image data to be printed out. An image rotation unit 2030 rotates an image. An image compression unit 2040 compresses or decompresses multivalued image data using a JPEG format, and binary image data using a JBIG, MMR or MH format.

Figure 2:
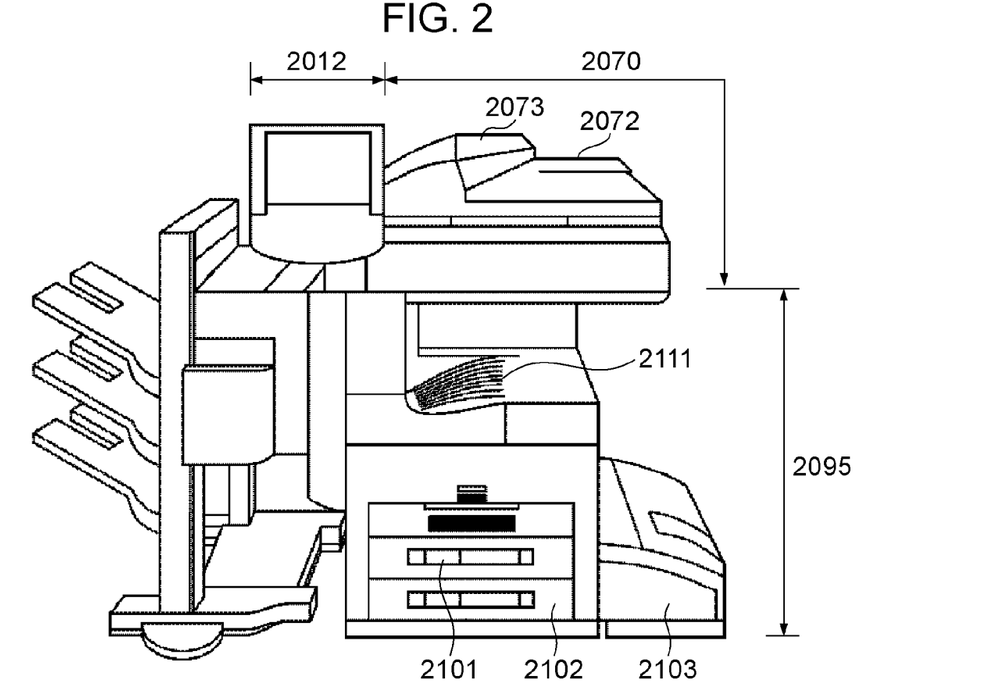
FIG. 2 is a diagram illustrating the appearance of an input/output device included in a rendering apparatus.

FIG. 2 is a diagram illustrating the appearance of a rendering apparatus. The scanner 2070 that is an image input device illuminates an image on a sheet that is an original, and scans the image using a CCD line sensor (not illustrated), thereby electrically converting the image into raster image data 2071 functioning as an electrical signal. When the user of the rendering apparatus sets original sheets on a tray 2073 of an original feeder 2072 and operates the operation unit 2012 so as to instruct the rendering apparatus to start reading, the CPU 2001 illustrated in FIG. 1 gives the instruction (2071) to the scanner 2070. In response to this instruction, the original feeder 2072 sequentially reads original images. The printer 2095, which is an image output device, converts raster image data 2096 into an image on a sheet. Examples of the conversion method include the electrophotographic conversion method using a photosensitive drum or a photosensitive belt, and the inkjet conversion method in which an image is directly printed on a sheet by ejecting ink onto the sheet from an array of small nozzles. A printing operation is performed in response to an instruction (2096) transmitted from the CPU 2001. The printer 2095 is provided with a plurality of sheet feed stages allowing a user to select a desired sheet size or a desired sheet orientation, sheet cassettes 2101, 2102, and 2103 corresponding to the sheet feed stages, and a sheet output tray 2111 for receiving printed sheets.

Figure 3:
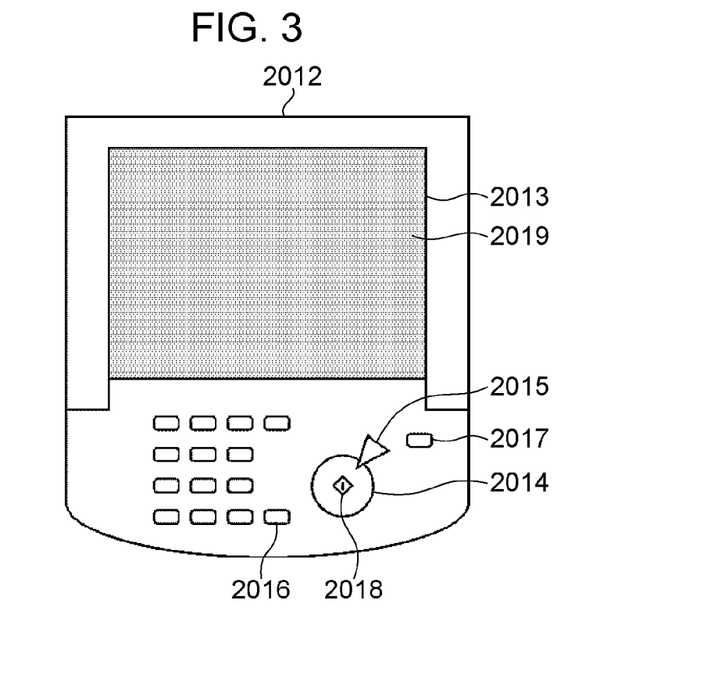
FIG. 3 is a diagram illustrating the appearance of an operation unit included in a rendering apparatus.

FIG. 3 is a diagram illustrating the structure of the operation unit 2012. An LCD display unit 2013 is provided with an LCD having a touch panel sheet 2019 affixed thereon, and displays a system operation screen and soft keys. When one of the displayed soft keys is pressed, the LCD display unit 2013 transmits information about the position of the pressed key to the CPU 2001. A start key 2014 is used to start the reading of an original image. In the center of the start key 2014, there is an LED 2018 for emitting green light and red light. The color of emitted light indicates whether the start key 2014 is available. A stop key 2015 is used to stop a current operation. An ID key 2016 is used to enter a user ID. A reset key 2017 is used to initialize the settings of the operation unit.

Figure 4:
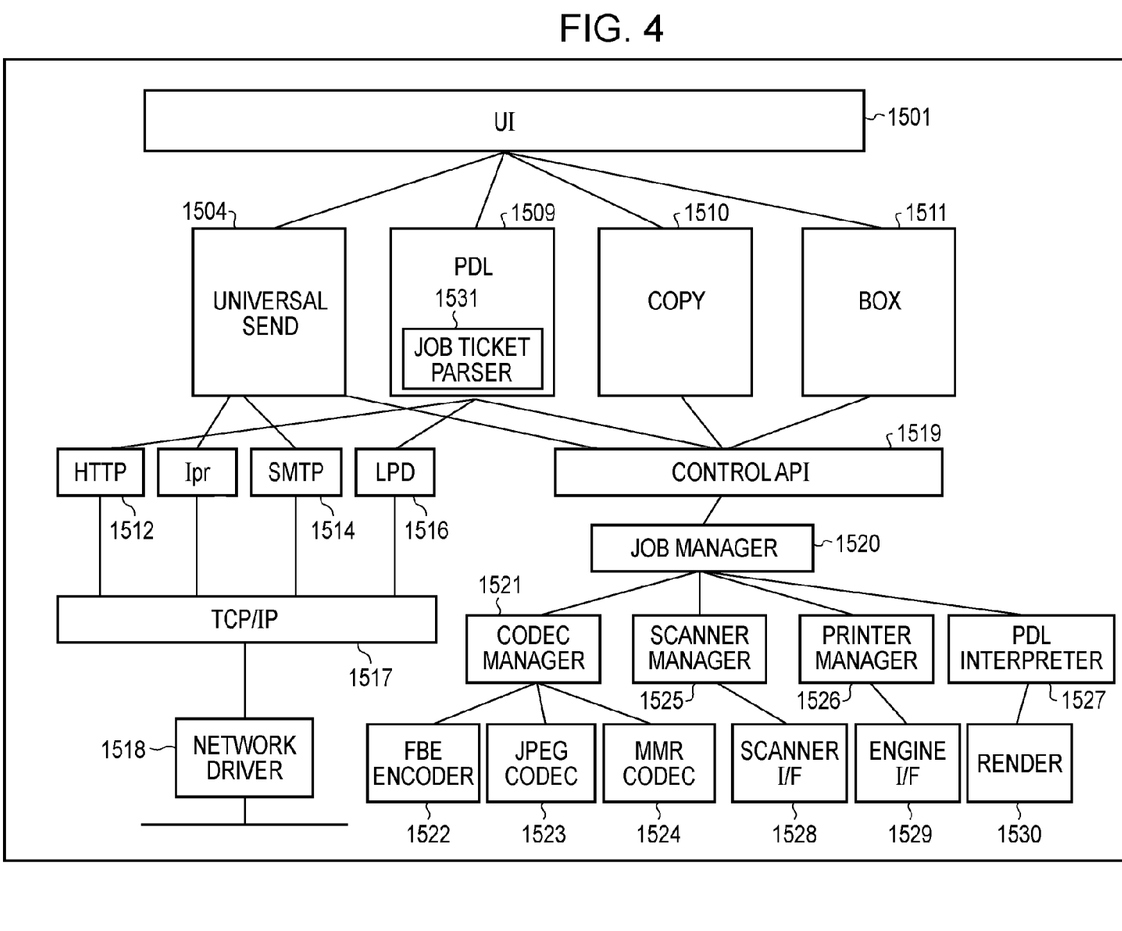
FIG. 4 is a block diagram illustrating the software of a rendering apparatus.

FIG. 4 is a block diagram illustrating the software of a rendering apparatus according to an embodiment of the present invention. The software illustrated in FIG. 4 is stored in the HDD 2004. After being loaded from the HDD 2004 into the RAM 2002, the software is executed by the CPU 2001.

A user interface (UI) 1501 is a module that functions as an interface between an operator and the rendering apparatus when the operator performs various operations and settings of the rendering apparatus. The user interface 1501 transfers input information to various modules (to be described later) in accordance with an operation performed by the operator so as to request processing or perform data setting.

A universal send module 1504 is a module for distributing data. The universal send module 1504 distributes data that has been specified by an operator using the user interface 1501 to a similarly specified communication (output) destination. If the generation of data to be distributed is instructed by an operator using the scanner function of this apparatus, the universal send module 1504 activates the apparatus via a control API module 1519 (to be described later) so as to generate data.

A PDL module 1509 is a module for achieving a function of printing a PDL (Page Description Language) document transmitted from the outside of the rendering apparatus using the print function of the rendering apparatus. A job ticket parser module 1531 included in the PDL module 1509 is a module for interpreting job ticket data received along with PDL data. The job ticket can specify a print medium, the number of copies, postprocessing, various pieces of color processing, and an image processing method. These pieces of information are interpreted by the job ticket parser module 1531 and are then transmitted to a job manager module 1520, a printer manager module 1526, and a PDL interpreter module 1527 via the control API module 1519. The PDL module 1509 also provides a function of extracting an electronic document stored in an external Web server using an HTTP module 1512 and printing the extracted electronic document.

A copy module 1510 is a module for performing copy processing using the printer and scanner functions of this rendering apparatus in accordance with an instruction from the user interface 1501.

A box module 1511 is a module for storing a scanned image or a PDL print image in an HDD and printing the stored image using a printer function. The box module 1511 also provides management functions such as transmission of data using the universal send function, deletion of a document stored in the HDD, grouping (storage of pieces of data in separate boxes), movement of data between boxes, and copying of data between boxes. Each box is used for long-term storage of data. However, a job hold function used for short-term storage of data is achieved by the box module 1511. Unlike the box, in the case of the job hold function, although grouping (storage of pieces of data in separate boxes), movement of data between boxes, and copying of data between boxes cannot be performed, print attribute change processing and reprint processing can be easily performed.

The HTTP module 1512 is a module used by the rendering apparatus to perform HTTP communication, and causes a TCP/IP communication module 1517 (to be described later) to provide communication for the PDL module 1509. An SMTP module 1514 causes the TCP/IP communication module 1517 (to be described later) to provide communication for the universal send module 1504. An LPD module 1516 causes the TCP/IP communication module 1517 (to be described later) to provide communication for the PDL module 1509. The TCP/IP communication module 1517 causes a network driver 1518 (to be described later) to provide network communication for the above-described various modules. The network driver 1518 controls a portion physically connected to the network.

The control API module 1519 provides an interface between an upstream module such as the universal send module 1504, the PDL module 1509, the copy module 1510, or the box module 1511 and a downstream module such as the job manager module 1520 to be described later. The control API module 1519 reduces the dependent relationship between the upstream modules and the downstream modules, and enhances the universality of these modules.

The job manager module 1520 interprets pieces of processing specified by the above-described various modules via the control API module 1519, and individually gives instructions to modules to be described later. The job manager module 1520 centrally manages pieces of hardware processing executed in the rendering apparatus. A CODEC manager 1521 manages and controls various pieces of data compression/decompression processing included in pieces of processing specified by the job manager module 1520. An FBE encoder 1522 compresses data obtained in scan processing performed by the job manager module 1520 and a scan manager 1525 using the FBE format. A JPEG codec module 1523 performs JPEG compression upon image data obtained in scan processing performed by the job manager module 1520 and the scan manager 1525, and performs JPEG expansion upon print data obtained in print processing performed by the printer manager module 1526. An MMR codec module 1524 performs MMR compression upon image data obtained in scan processing performed by the job manager module 1520 and the scan manager 1525, and performs MMR decompression upon print data obtained in print processing performed by the printer manager module 1526.

The scan manager 1525 manages and controls scan processing specified by the job manager module 1520. A scanner I/F 1528 provides an interface between the scan manager 1525 and the scanner unit internally connected to the rendering apparatus.

The printer manager module 1526 manages and controls print processing specified by the job manager module 1520. An engine I/F driver 1529 provides an interface between the printer manager module 1526 and the printer.

The PDL interpreter 1527 interprets a PDL or electronic document format such as LIPS, PostScript, PCL, PDF, SVG, or PPML in accordance with an instruction transmitted from the job manager module 1520, and generates a display list that is a common expression form independent of the PDL or electronic document format.

A render module 1530 expands the display list generated by the PDL interpreter 1527 into a raster image memory using an image processor in accordance with an instruction transmitted from the printer manager module 1526.

Figure 5:
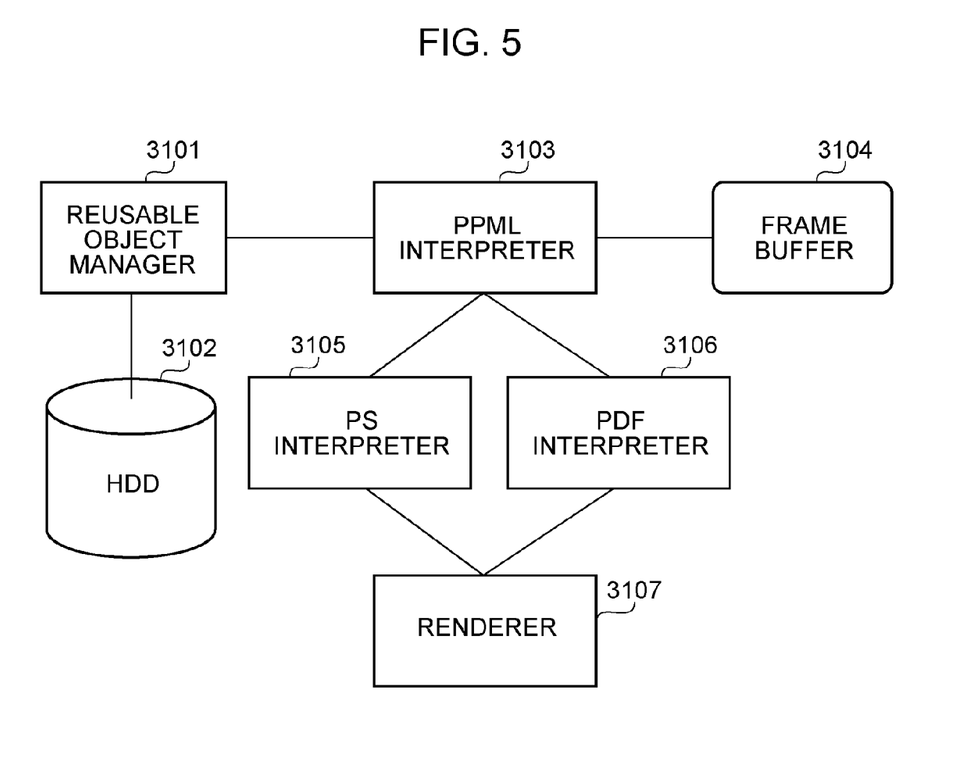
FIG. 5 is a block diagram illustrating modules included in a PDL interpreter.

Next, the configuration of a PPML interpreter and peripheral modules and the process performed by the PPML interpreter and the peripheral modules will be described with reference to FIG. 5. Modules other than a renderer illustrated in FIG. 5 are included in the PDL interpreter 1527 illustrated in FIG. 4. A program for executing the process illustrated in FIG. 5 is stored in the HDD 2004. After being loaded from the HDD 2004 into the RAM 2002, the program is executed by the CPU 2001.

A PPML interpreter 3103 is a module for interpreting PPML data and generating a raster image for each page. A frame buffer 3104 stores the generated raster image. PPML is an XML data format, and an XMP parser is used in the parser portion of PPML. PPML describes only the layout of a page, and an actual rendering command depends on a PDL language such as PS or PDF. Accordingly, a PPML job is input as an archive format file including a PPML file and a PS or PDF rendering command. The PPML interpreter 3103 unarchives the archive format file and spools the file. Subsequently, the PPML interpreter 3103 starts to interpret PPML data. If the PPML interpreter 3103 detects a reference to the PS or PDF file which has been made by the PPML file, the PPML interpreter 3103 activates a PS interpreter 3105 or a PDF interpreter 3106 so as to perform RIP processing. The PS interpreter 3105 is a module for interpreting PS data and generating intermediate data.

The PDF interpreter 3106 is a module for interpreting PDF data and generating intermediate data. Both of the PS interpreter 3105 and the PDF interpreter 3106 generate a raster image using the renderer 3107. There are two types of PPML rendering objects expressed with PS or PDF data, that is, a reusable object assumed to be repeatedly used and a local object assumed to be used only once. The reusable object is used in a case in which the same image is rendered on a plurality of portions using the same source rendering data regardless of whether these portions are included in the same page or different pages, or whether the printing of the image on these portions is instructed by different jobs. If the rendering object is a local object, the PPML interpreter 3103 transmits the address of the frame buffer 3104 and rendering position information to the PS interpreter 3105 and the PDF interpreter 3106. Each of the PS interpreter 3105 and the PDF interpreter 3106 directly generates a raster image in a specified area of the frame buffer 3104.

On the other hand, if the rendering object is a reusable object, the PPML interpreter 3103 requests each interpreter to generate a raster image and transmit the generated raster image thereto. Each interpreter reserves the minimum memory area required for rendering of a rendering object, performs rendering in the reserved area, and transmits the address of the area in which rendering has been performed to the PPML interpreter 3103. The PPML interpreter 3103 writes the raster image obtained by rendering in the frame buffer 3104. Furthermore, the PPML interpreter 3103 transmits the raster image to a reusable object manager 3101. The reusable object manager 3101 is a module for caching a rendered raster image, and has functions of storing, retrieving, extracting, and deleting a rendered raster image. The PPML interpreter 3103 determines whether the reusable object manager 3101 has a rendered raster image of a reusable object before rendering the reusable object. The reusable object manager 3101 stores a rendered raster image in a memory or an HDD 3102. If a memory is available, the reusable object manager 3101 stores the rendered raster image in the memory. On the other hand, if the memory is unavailable, the reusable object manager 3101 stores the rendered raster image in the HDD. An infrequently-extracted rendered raster image is automatically moved from the memory to the HDD (swap-out).

Figure 6:
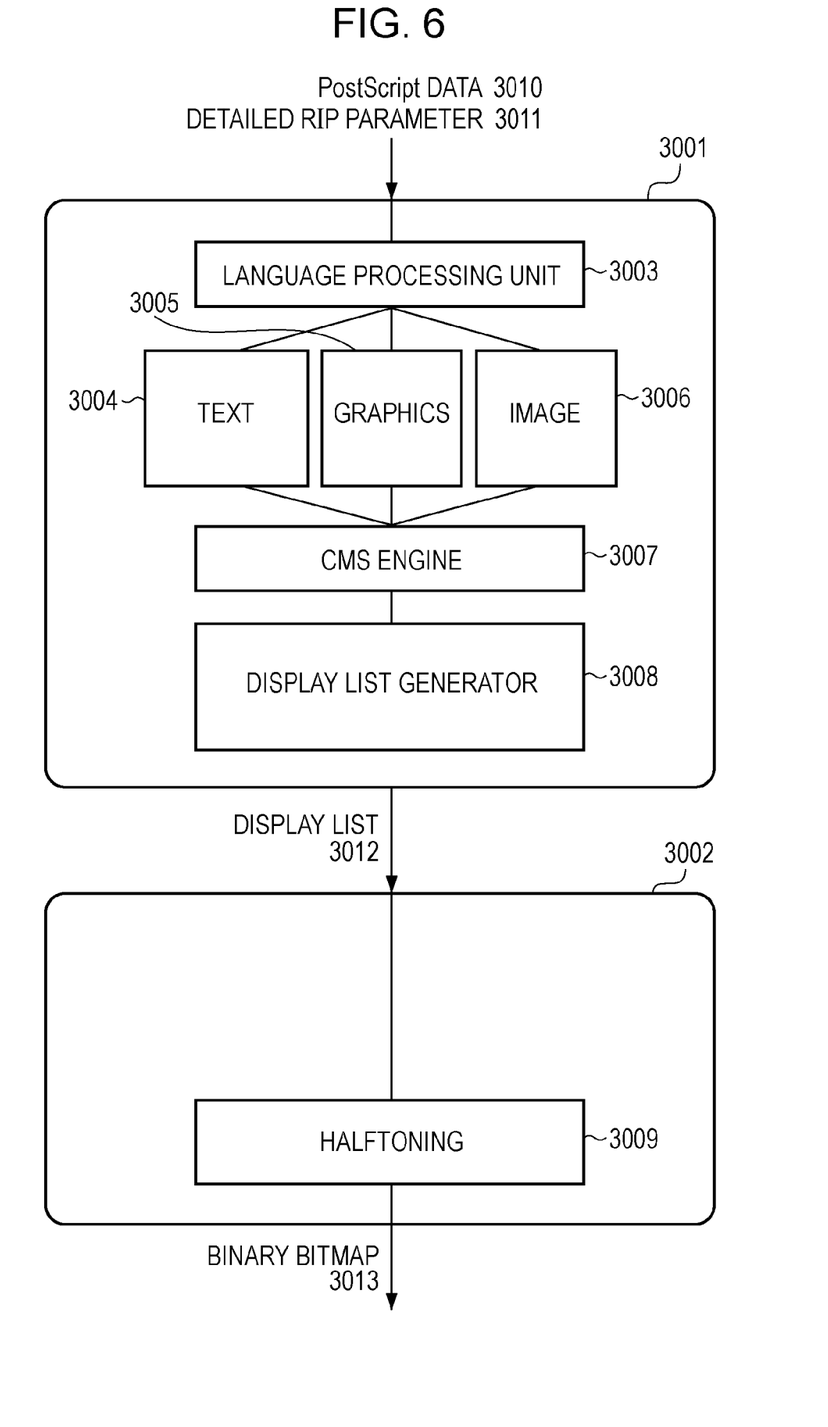
FIG. 6 is a diagram illustrating a data flow in a PDL interpreter.

Next, a RIP process of interpreting a page description language and forming an image will be described with reference to FIG. 6. A program for executing the process illustrated in FIG. 6 is stored in the HDD 2004. After being loaded from the HDD 2004 into the RAM 2002, the program is executed by the CPU 2001.

A PostScript interpreter 3001 is part of the PDL interpreter illustrated in FIG. 4. The PostScript interpreter 3001 interprets PostScript data 3010 and generates a display list 3012 that is intermediate language data.

Modules included in the PostScript interpreter 3001 are subjected to Pipeline processing. Modules 3004 to 3008 are individually executed for each rendering object. After processing all rendering objects in a single page, a display list for one page is generated.

A detailed RIP parameter 3011 is included in pieces of information specified by a job ticket, and is a set of parameters to be used for RIP processing. For example, these parameters include an output color mode, an RGB source profile, a CMYK simulation profile, and an output profile. If the postscript interpreter 3001 is activated by the PPML interpreter, the number of a page to be RIPped and a RIP processing position in the page are specified. As described previously, the job ticket is interpreted by the job ticket parser module 1531 illustrated in FIG. 4.

A language processing unit 3003 interprets PostScript language data, and transmits a rendering request to a text processing unit 3004, a graphics processing unit 3005, and an image processing unit 3006 in accordance with a rendering operator.

The text processing unit 3004 generates a text bitmap on the basis of a specified font. The graphics processing unit 3005 controls vector graphics rendering. The image processing unit 3006 converts image data into a common internal data format.

A CMS engine 3007 is a color management module that converts input colors into absolute color space and generates an output color (gray) unique to the printer engine. The PostScript language defines various pieces of color space such as the device color space, the CIEBased color space, and special color space. As for input colors specified in the device color space, the CMS engine 3007 converts the colors using a specified one of ICC profiles such as an RGB source profile and a CMYK simulation profile prepared in advance. As for input colors specified in the CIEBased color space, the CMS engine 3007 converts the colors using a conversion table, a conversion function, and a conversion matrix which are specified in the color space. The CMS engine 3007 converts absolute color space into color space unique to the printer engine using an output profile or the color rendering dictionary specified in PostScript.

A display list generator 3008 generates the display list 3012 that is intermediate language data. The display list 3012 contains the attribute flag of each object which is used to determine whether the object is a graphic, image, or text object. Information about an attribute is transmitted from the text processing unit 3004, the graphics processing unit 3005, or the image processing unit 3006. The attribute flag is transmitted via a renderer to the subsequent stage so as to be used for image processing. The display list 3012 contains raster operation information of each rendering object which is used to determine whether the object requires raster operation processing.

A renderer 3002 interprets the display list 3012 so as to generate a binary bitmap 3013. The renderer 3002 has raster operation modes such as Mask (result=src & dest), Copy (result=src), and Merge (result=src|dest). The renderer 3002 executes raster operation processing between a rendered object (background, dest) and the next object to be rendered (foreground, src) in accordance with a raster operation mode specified for each rendering object. The renderer 3002 expands the result of the raster operation processing in a page memory. The halftoning unit 3009 refers to an object attribute map so as to apply different halftoning methods to different object attributes. The halftoning unit 3009 applies a resolution priority high-LPI screen to an image area of the graphics attribute, a gradation priority low-resolution screen to an image area of the image attribute, and an error diffusion method to an image area of the text attribute. The binary bitmap 3013 is transferred to a printer engine via the engine I/F driver 1529 illustrated in FIG. 4, and is then printed out on a desired medium.

Figure 7:
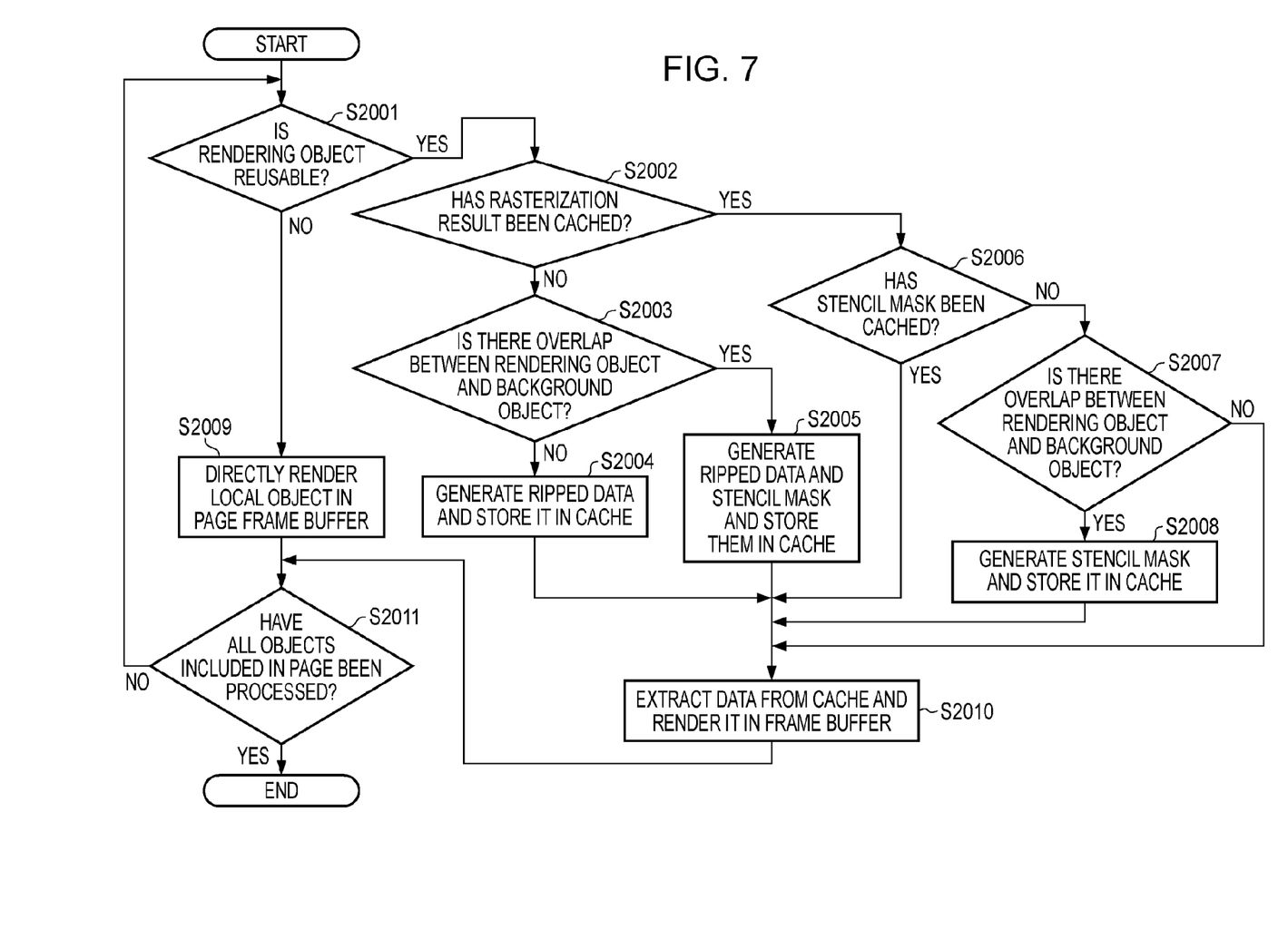
FIG. 7 is a flowchart illustrating a cache algorithm.

FIG. 7 is a flowchart describing a method of processing a reusable object (object to be reused) and a local object (normal object not to be reused) which is performed by a PPML interpreter. A program for executing the process illustrated in FIG. 7 is stored in the HDD 2004. After being loaded from the HDD 2004 into the RAM 2002, the program is executed by the CPU 2001. If a PPML interpreter starts the process and detects a rendering object, in step S2001, it is determined whether the detected rendering object is a reusable object. In the case of PPML, if a rendering object is a reusable object, information indicating that the rendering object is a reusable object and an identifier used to refer to the reusable object are included in the rendering object. Accordingly, it can be determined whether a detected rendering object is a reusable object. In the case of a rendering object including no such information, it can be determined whether a detected rendering object is a reusable object by analyzing all rendering objects. If the detected rendering object is not a reusable object, that is, the detected rendering object is a local object, the process proceeds to step S2009. In step S2009, the local object is directly rendered in a page frame buffer. As described previously, in the case of PPML, a rendering object is generally described in the PostScript or PDF format. Each rendering object included in a PPML file includes a reference to a PostScript or PDF file. The PPML interpreter causes a PostScript or PDF interpreter to perform rendering processing upon a PostScript or PDF file referenced by the rendering object. Furthermore, each rendering object included in the PPML file includes coordinate information about a rendering position in a page. The PPML interpreter transmits the coordinate information to the PostScript or PDF interpreter. The PostScript or PDF interpreter performs rendering at a predetermined position in the page frame buffer on the basis of the coordinate information. Subsequently, the process proceeds to step S2011 in which it is determined whether all rendering objects included in a page have been processed. If all the rendering objects have not yet been processed, the process proceeds to step S2001 and the same process is repeated. On the other hand, if all the rendering objects have been processed, the process ends.

On the other hand, if it is determined in step S2001 that the detected object is a reusable object, the process proceeds to step S2002. In step S2002, the PPML interpreter determines whether the rasterization result (RIP processing result) of the rendering object has been cached by contacting a reusable object manager. If it is determined in step S2002 that the rasterization result has not been cached, the process proceeds to step S2003 in which it is determined whether there is an overlap between the rendering object and a background object. If it is determined in step S2003 that there is no overlap between them, the process proceeds to step S2004 in which a RIPped image is generated and is then stored in a cache. Here, RIP processing is similarly performed by the PostScript or PDF interpreter. The storage of the RIPped image is performed in such a manner that data is transferred to the reusable object manager via the PPML interpreter. Subsequently, the process proceeds to step S2010.

If it is determined in step S2003 that there is an overlap between the rendering object and a background object, the process proceeds to step S2005 in which a RIPped image and a stencil mask are generated and are then stored in the cache. Here, RIP processing is similarly performed by the PostScript or PDF interpreter. Furthermore, the stencil mask is also generated by the PostScript or PDF interpreter. In the stencil mask, the value of a pixel that is originally painted is 1, and the value of a pixel that is not painted is 0. That is, if a RIPped pixel has a value other than 0, the CPU 2001 sets a corresponding pixel value to 1 in the stencil mask. If a RIPped pixel has a value of 0, the CPU 2001 sets a corresponding pixel value to 0 in the stencil mask. The storage of the RIPped image and the stencil mask in the cache is performed in such a manner that data is transferred to the reusable object manager via the PPML interpreter. Subsequently, the process proceeds to step S2010.

If it is determined in step S2002 that the rasterization result has been cached, the process proceeds to step S2006. In step S2006, it is determined whether a stencil mask has been cached. If it is determined in step S2006 that the stencil mask has been cached, the process proceeds to step S2010. On the other hand, if it is determined in step S2006 that the stencil mask has not been cached, the process proceeds to step S2007. In step S2007, it is determined whether there is an overlap between the rendering object and a background object. If it is determined in step S2007 that there is an overlap between them, the process proceeds to step S2008 in which a stencil mask is generated and is then stored in the cache. Here, the generation of the stencil mask is similarly performed by the PostScript or PDF interpreter. In the stencil mask, the value of a pixel that is originally painted is 1, and the value of a pixel that is not painted is 0. That is, if a RIPped pixel has a value other than 0, the CPU 2001 sets a corresponding pixel value to 1 in the stencil mask. If a RIPped pixel has a value of 0, the CPU 2001 sets a corresponding pixel value to 0 in the stencil mask. The storage of the stencil mask in the cache is performed in such a manner that data is transferred to the reusable object manager via the PPML interpreter. Subsequently, the process proceeds to step S2010. If it is determined in step S2007 that there is no overlap, the process also proceeds to step S2010.

In step S2010, the data of the rendering object is extracted from the cache and the extracted data is rendered in the frame buffer. At that time, a rendering method varies in accordance with whether stencil mask data for the rendering object is stored in the cache. If the stencil mask is not stored in the cache, the extracted RIPped image is directly written in the frame buffer. If the stencil mask is stored in the cache, the RIPped image is stenciled using the stencil mask and is then written in the frame buffer. In the above-described process, if there is an overlap between the rendering object and a background object, a stencil mask is generated without fail. Accordingly, in a portion that is not subjected to rendering with a foreground object, the background object remains. If the processing of step S2010 is completed, the process proceeds to step S2011. Subsequently, the process is repeated until all the rendering objects included in the page have been processed.

In the process illustrated in FIG. 7, a stencil mask is generated as needed so as to save time required for the generation of a stencil mask and memory. The flowchart illustrates the process for one page. If there are a plurality of pages, the process is repeatedly performed. There is no essential distinction between these cases. However, in the case in which there are a plurality of pages, the storage of objects, which are included in these pages, in a cache is maintained. Accordingly, there may be a case in which a RIPped object included in the previous page may remain in the cache.

Figure 8A:
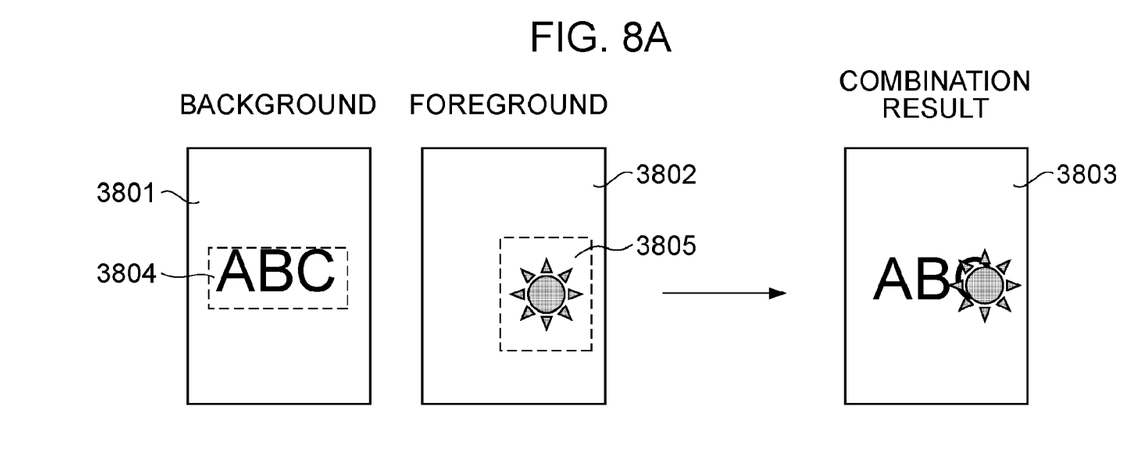
FIGS. 8A and 8B are schematic diagrams illustrating an object combination method.
Figure 8B:
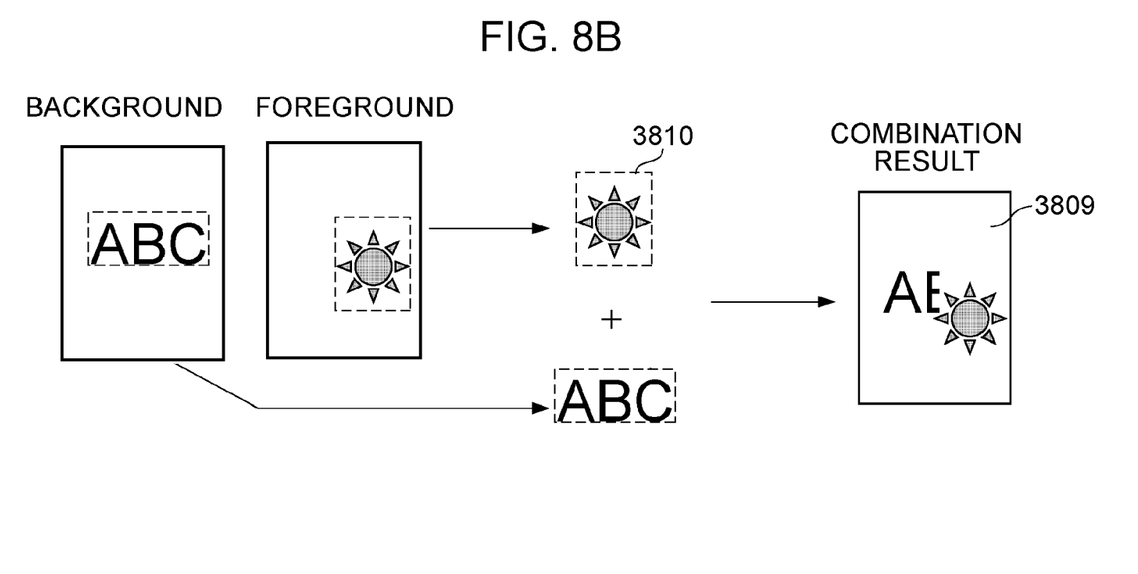
Figure 9:
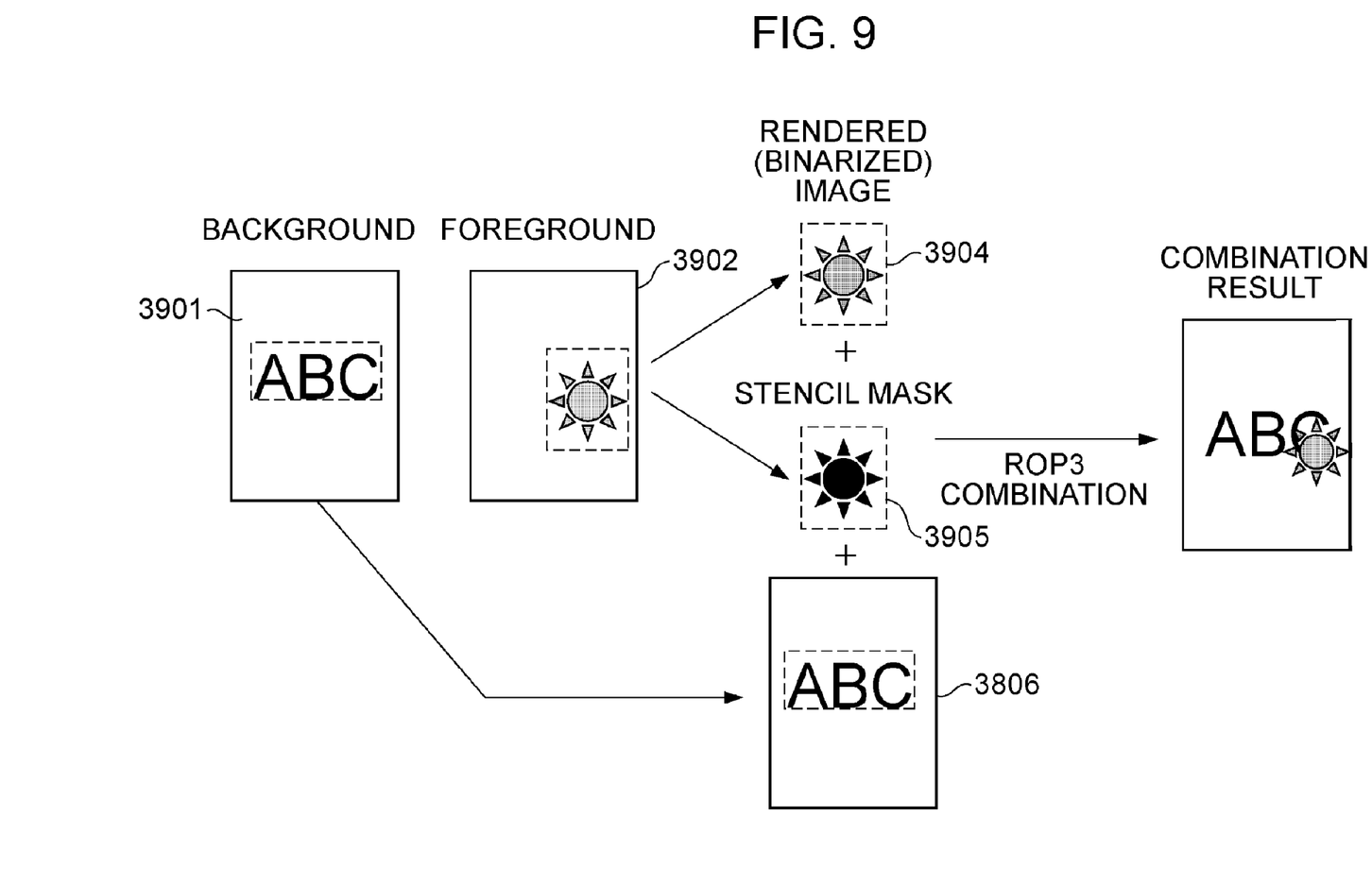
FIG. 9 is a schematic diagram illustrating an object combination method.

FIG. 9 is a diagram illustrating a detailed processing method performed in a case illustrated in FIG. 8A. If a foreground image 3902 is combined with a background image 3901, a foreground graphic object overlaps a background text object. Accordingly, both of a RIPped image 3904 and a stencil mask 3905 are generated from the foreground graphic object. The RIPped image 3904 is a binarized image having a halftone expressed by the distribution of black pixels and white pixels. That is, even if a pixel is a halftone pixel in an original image, the pixel may be painted white in the RIPped image. The stencil mask 3905 is binary data in which the bit value of a pixel that is painted is 1 and the bit value of a pixel that is not painted is 0. The RIPped image 3904, the stencil mask 3905, and a RIPped background page 3906 are combined by performing ROP3 processing.

Figure 10A:
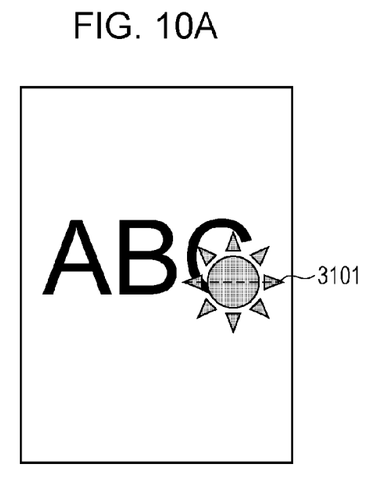
FIGS. 10A and 10B are diagrams illustrating pixel values in the process of combination.
Figure 10B:
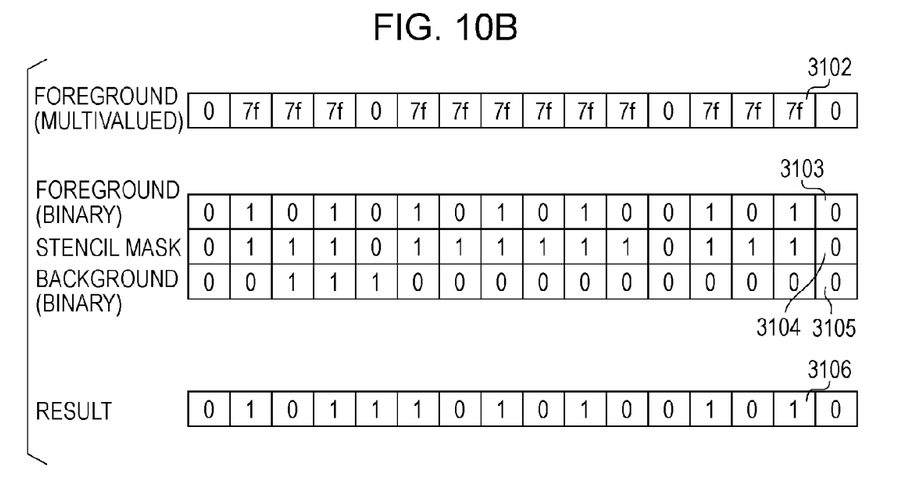

A ROP3 combination method will be described with reference to FIGS. 10A and 10B. Description will be made using a scan line 3101 illustrated in FIG. 10A. FIG. 10B is a diagram illustrating the values of pixels on the scan line 3101. A pixel value 3102 denotes the value of each pixel included in an original foreground graphic object. Each pixel has an 8-bit gray scale value (that is, 256 gradation levels). Here, the value of a pixel to be painted is 7f. Since the foreground is a graphic object, the foreground is not expressed by such the arrangement of pixels in reality. A pixel value 3103 denotes a pixel value obtained by performing RIP processing upon the foreground graphic object and binarizing the RIPped foreground graphic object. Each pixel has a 1-bit value. The value of a pixel to be painted is 1, and the value of a pixel not to be painted is 0.

In some cases, a pixel having a halftone value of 7f as the pixel value 3102 is mapped to a pixel not to be painted. The reason for this is that a halftone is expressed by the distribution of 1 and 0. A pixel value 3104 denotes each pixel value in a stencil mask. The value of a pixel corresponding to an original pixel that is painted is 1, and the value of a pixel corresponding to an original pixel that is not painted is 0. That is, if a RIPped pixel has a value other than 0, a corresponding pixel value is 1 in the stencil mask. If a RIPped pixel has a value of 0, a corresponding pixel value is 0 in the stencil mask. Here, the value of a pixel corresponding to an original painted pixel having a halftone value of 7f as the pixel value 3102 is 1 in the stencil mask. A pixel value 3105 is a pixel value obtained by performing RIP processing upon the background text object and binarizing the RIPped background text object. A pixel value 3106 is the result of the ROP3 combination of the foreground pixel value 3103, the stencil mask pixel value 3104, and the background pixel value 3105. In the ROP3 combination processing, a foreground pixel is used at a pixel having a bit value of 1 in the stencil mask, and a background pixel is used at a pixel having a bit value of 0 in the stencil mask.

By performing the above-described processing, in step S2010 illustrated in FIG. 7, an image and a mask can be extracted from a cache, and the extracted image can be rendered on the portion of the extracted mask so that a background image remains on a portion other than the portion of the extracted mask.

Figure 11:
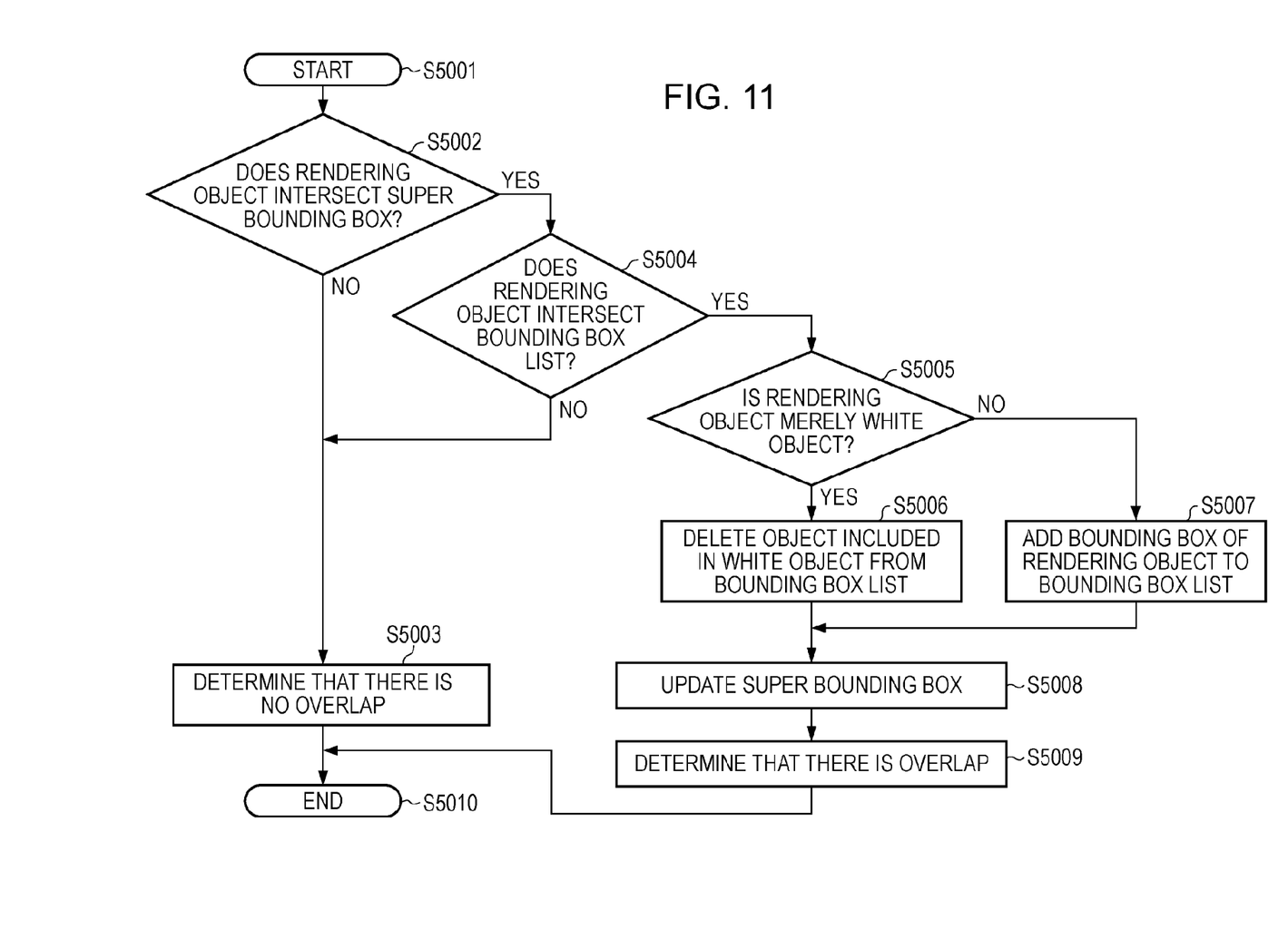
FIG. 11 is a flowchart illustrating an object overlap determination process.

FIG. 11 is a flowchart illustrating the details of the process of determining whether there is an overlap between a rendering object and a background object which is performed in step S2003 illustrated in FIG. 7. A program for executing the process illustrated in FIG. 11 is stored in the HDD 2004. After being loaded from the HDD 2004 into the RAM 2002, the program is executed by the CPU 2001. Background objects are managed using a bounding box list of bounding boxes of the background objects. The minimum rectangle containing the bounding box list is managed as a super bounding box. The bounding box list and the super bounding box are reset at the top of each page.

In step S5001, the process starts. In step S5002, it is determined whether the rendering object intersects the super bounding box. If it is determined in step S5002 that the rendering object does not intersect the super bounding box, the process proceeds to step S5003. In step S5003, it is determined that there is no overlap between the rendering object and the background object, and the process ends (S5010). If it is determined in step S5002 that the rendering object intersects the super bounding box, the process proceeds to step S5004. In step S5004, it is determined whether the rendering object intersects the bounding box list. If it is determined in step S5004 that the rendering object does not intersect the bounding box list, the process proceeds to step S5003. In step S5003, it is determined that there is no overlap between the rendering object and the background object, and the process ends. If it is determined in step S5004 that the rendering object intersects the bounding box list, the process proceeds to step S5005. In step S5005, it is determined whether the entire area of the rendering object is painted white. If it is determined in step S5005 that the entire area of the rendering object is painted white, the process proceeds to step S5006 in which a bounding box included in the object painted white is deleted from the bounding box list. If it is determined in step S5005 that the entire area of the rendering object is not painted white, the process proceeds to step S5007. In step S5007, the bounding box of the rendering object is added to the bounding box list. After the processing has been completed in step S5006 or step S5007, the process proceeds to step S5008. In step S5008, the super bounding box is updated. That is, the updating of the bounding box list which has been performed in step S5006 or S5007 is reflected in the updating of the super bounding box. Subsequently, the process proceeds to step S5009 in which it is determined that there is an overlap between the rendering object and the background object.

Thus, by determining whether a rendering object intersects a background object on the basis of rectangular area information defined in the rendering object and rectangular area information defined in the background object, the load of the overlap determination processing can be lightened. In order to improve the accuracy of the overlap determination processing, it may be determined whether there is an overlap between the image portions of a rendering object and a background object. In this case, however, the load of the overlap determination processing is increased.

As described previously, by using both of image data obtained by performing RIP processing upon a rendering object and stencil mask data, correct rendering can be achieved. By caching these two pieces of data, high-speed rendering processing can be achieved since RIP processing is not required to be performed at the time of reusing the rendering object. By determining whether there is an overlap between objects, the number of times a stencil mask is generated can be reduced to the minimum. By reducing the number of times a stencil mask is generated, time required for the generation of a stencil mask can be saved. This leads to the increase in the speed of rendering processing. That is, as described previously in this embodiment, a rendering apparatus capable of accurately performing rendering processing at high speeds can be achieved.

The present invention may be applied to a system including a plurality of apparatuses such as a printer, a host computer, an interface apparatus, and a scanner, or a print apparatus. An output apparatus for outputting a rendering result is not limited to a printer. A display device may output a rendering result. A viewer application for displaying an electronic file on a computer can easily achieve the output of a rendering result.

The computer (CPU or MPU) of the system or the print apparatus reads out a program code from a computer-readable storage medium and executes the read program code. In this case, the program code itself read out from the computer-readable storage medium achieves the functions of the above-described embodiment. It is required that the computer-readable storage medium (recording medium) recording the program code for achieving the functions of the above-described embodiment be supplied to the system or the print apparatus. The present invention may be applied to the computer-readable storage medium recording the program code.

As described previously, the computer executes the read program code, whereby the functions of the above-described embodiment are achieved. However, the functions of the above-described embodiment are also achieved in a case in which an operating system (OS) running on the computer performs a part of or all of actual processing in accordance with the instruction of the program code. Furthermore, the functions of the above-described embodiment are also achieved in a case in which the program code read out from the computer-readable storage medium is written in a memory included in a function expansion card inserted into the computer or a function expansion unit connected to the computer, and a CPU included in the function expansion card or the function expansion unit performs a part of or all of actual processing in accordance with the instruction of the program code.

As described previously, according to this embodiment, an overlap between rendering objects can be correctly processed, and a RIPped image generated from a reusable object can be cached. For example, even in the case of a VDP language such as PPML or PDL allowing objects to overlap, high-speed RIP processing can be achieved in accordance with rendering specifications. Furthermore, a foreground rendering object can be rapidly rendered so that a background rendering image remains in a portion in which the foreground rendering object is not rendered.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-316808 filed Dec. 7, 2007, which is hereby incorporated by reference herein in its entirety.

What is claimed is:

1. A rendering apparatus comprising:
   a cache determination unit configured to determine whether a rasterization result of a rendering object is cached;
   a cache unit configured to, in a case that the cache determination unit determines that the rasterization result of the rendering object is not cached, generate an image and a mask for the image from the rendering object and store the generated image and the generated mask in a cache; and
   a rendering unit configured to, in a case that the cache determination unit determines that the rasterization result of the rendering object is cached, extract an image and a mask from the cache and render the extracted image on a portion of the extracted mask so that a background image remains on a portion other than the portion of the mask.

2. The rendering apparatus according to claim 1, further comprising an overlap determination unit configured to determine whether there is an overlap between the rendering object and a background object, and
   wherein, in a case that the cache determination unit determines that the rasterization result of the rendering object is not cached and the overlap determination unit determines that there is an overlap between the rendering object and the background object, the cache unit generates the image and the mask for the image from the rendering object and stores the generated image and the generated mask in the cache, and
   wherein, in a case that the cache determination unit determines that the rasterization result of the rendering object is not cached and the overlap determination unit determines that there is no overlap between the rendering object and the background object, the cache unit generates the image from the rendering object and stores the generated image in the cache.

3. The rendering apparatus according to claim 2, wherein, in a case that it is determined that the rendering object intersects the background object on the basis of area information of the rendering object and area information of the background object, the overlap determination unit determines that there is an overlap between the rendering object and the background object.

4. The rendering apparatus according to claim 1, further comprising a reuse determination unit configured to determine whether the rendering object is to be reused, and
   wherein, in a case that the reuse determination unit determines that the rendering object is to be reused, the cache determination unit determines whether the rasterization result of the rendering object is cached.

5. The rendering apparatus according to claim 1,
   wherein, in a case that the cache determination unit determines that the rasterization result of the rendering object is cached, the cache unit determines whether a mask for the cached image is cached, and
   wherein, in a case that the cache unit determines that a mask for the cached image is not cached, the cache unit stores a mask generated from the cached image in the cache.

6. The rendering apparatus according to claim 1, wherein the rendering object includes multivalued data.

7. A rendering method comprising:
   determining whether a rasterization result of a rendering object is cached;
   in a case that it is determined that the rasterization result of the rendering object is not cached, generating an image and a mask for the image from the rendering object and storing the generated image and the generated mask in a cache; and
   in a case that it is determined that the rasterization result of the rendering object is cached, extracting an image and a mask from the cache and rendering the extracted image on a portion of the extracted mask so that a background image remains on a portion other than the portion of the mask.

8. The rendering method according to claim 7, further comprising determining whether there is an overlap between the rendering object and a background object, and wherein, in a case that it is determined that the rasterization result of the rendering object is not cached and there is an overlap between the rendering object and the background object, the image and the mask for the image are generated from the rendering object and the generated image and the generated mask are stored in the cache, and wherein, in a case that it is determined that the rasterization result of the rendering object is not cached and there is no overlap between the rendering object and the background object, the image is generated from the rendering object and the generated image is stored in the cache.

9. The rendering method according to claim 8, wherein, in a case that it is determined that the rendering object intersects the background object on the basis of area information of the rendering object and area information of the background object, it is determined that there is an overlap between the rendering object and the background object.

10. The rendering method according to claim 7, further comprising determining whether the rendering object is to be reused, and wherein, in a case that it is determined that the rendering object is to be reused, it is determined whether the rasterization result of the rendering object is cached.

11. The rendering method according to claim 7, wherein, in a case that it is determined that the rasterization result of the rendering object is cached, it is determined whether a mask for the cached image is cached, and wherein, in a case that it is determined that a mask for the cached image is not cached, a mask generated from the cached image is stored in the cache.

12. The rendering method according to claim 7, wherein the rendering object includes multivalued data.

13. A non-transitory computer-readable storage medium storing a program for causing a rendering apparatus to perform a method comprising:

determining whether a rasterization result of a rendering object is cached;

in a case that it is determined that the rasterization result of the rendering object is not cached, generating an image and a mask for the image from the rendering object and storing the generated image and the generated mask in a cache; and in a case that it is determined that the rasterization result of the rendering object is cached, extracting an image and a mask from the cache and rendering the extracted image on a portion of the extracted mask so that a background image remains on a portion other than the portion of the mask.

14. The non-transitory computer-readable storage medium according to claim 13, wherein the method includes determining whether there is an overlap between the rendering object and a background object, wherein, in a case that it is determined that the rasterization result of the rendering object is not cached and there is an overlap between the rendering object and the background object, the image and the mask for the image are generated from the rendering object and the generated image and the generated mask are stored in the cache, and wherein, in a case that it is determined that the rasterization result of the rendering object is not cached and there is no overlap between the rendering object and the background object, the image is generated from the rendering object and the generated image is stored in the cache.

15. The non-transitory computer-readable storage medium according to claim 14, wherein, in a case that it is determined that the rendering object intersects the background object on the basis of area information of the rendering object and area information of the background object, it is determined that there is an overlap between the rendering object and the background object.

16. The non-transitory computer-readable storage medium according to claim 13, wherein the method further includes determining whether the rendering object is to be reused, and wherein, in a case that it is determined that the rendering object is to be reused, it is determined whether the rasterization result of the rendering object is cached.

17. The non-transitory computer-readable storage medium according to claim 13, wherein, in a case that it is determined that the rasterization result of the rendering object is cached, it is determined whether a mask for the cached image is cached, and wherein, in a case that it is determined that a mask for the cached image is not cached, a mask generated from the cached image is stored in the cache.

18. A print apparatus comprising:

a cache determination unit configured to determine whether a rasterization result of a rendering object is cached;

a cache unit configured to, in a case that the cache determination unit determines that the rasterization result of the rendering object is not cached, generate an image and a mask for the image from the rendering object and store the generated image and the generated mask in a cache;

a rendering unit configured to, in a case that the cache determination unit determines that the rasterization result of the rendering object is cached, extract an image and a mask from the cache and render the extracted image on a portion of the extracted mask so that a background image remains on a portion other than the portion of the mask; and a print unit configured to print an image rendered by the rendering unit.

19. A rendering apparatus comprising:

a cache determination means for determining whether a rasterization result of a rendering object is cached;

a cache means for generating, in a case that the cache determination unit determines that the rasterization result of the rendering object is not cached, an image and a mask for the image from the rendering object and for storing the generated image and the generated mask in a cache; and a rendering means for extracting, in a case that the cache determination unit determines that the rasterization result of the rendering object is cached, an image and a mask from the cache and render the extracted image on a portion of the extracted mask so that a background image remains on a portion other than the portion of the mask.

20. A rendering apparatus comprising:

a cache determination unit configured to determine whether a rasterization result of a rendering object is cached;

a cache unit configured to generate an image and a mask for the image from the rendering object and store the generated image and the generated mask in a cache;

a rendering unit configured to, in a case that the cache determination unit determines that the rasterization result of the rendering object is cached, extract an image and a mask from the cache and render the extracted image on a portion of the extracted mask so that a background image remains on a portion other than the portion of the mask; and an overlap determination unit configured to determine whether there is an overlap between the rendering object and a background object, wherein the cache unit is configured, in a case that the cache determination unit determines that the rasterization result of the rendering object is not cached and the overlap determination unit determines that there is an overlap between the rendering object and the background object, to generate the image and the mask for the image from the rendering object and to store the generated image and the generated mask in the cache, wherein the cache unit is configured, in a case that the cache determination unit determines that the rasterization result of the rendering object is not cached and the overlap determination unit determines that there is no overlap between the rendering object and the background object, to generate the image from the rendering object without generating the mask for the image from the rendering object and to store the generated image without storing the mask in the cache, and wherein the cache unit is configured to, in a case that a rasterization result of the rendering object has been cached, determine whether the mask has been cached, and the cache unit is configured to, in a case that the mask is determined not to have been cached, determine whether an overlap exists between the rendering object and a background image, and the cache unit is configured to, in a case that the overlap is determined not to exist, extract the image from the cache and render the extracted image and, in a case that the overlap is determined to exist, generate a mask and cache the generated mask before extracting the image and mask from the cache and rendering the extracted image on a portion of the extracted mask so that the background image remains on a portion other than the portion of the mask.

21. A method comprising:

determining whether a rasterization result of a rendering object is cached;

generating an image and a mask for the image from the rendering object and storing the generated image and the generated mask in a cache;

in a case that it is determined that the rasterization result of the rendering object is cached, extracting an image and a mask from the cache and rendering the extracted image on a portion of the extracted mask so that a background image remains on a portion other than the portion of the mask; and determining whether there is an overlap between the rendering object and a background object, wherein, in a case that it is determined that the rasterization result of the rendering object is not cached and there is an overlap between the rendering object and the background object, the image and the mask for the image are generated from the rendering object and the generated image and the generated mask are stored in the cache, wherein, in a case that it is determined that the rasterization result of the rendering object is not cached and there is no overlap between the rendering object and the background object, the image is generated from the rendering object without generating the mask for the image from the rendering object and the generated image is stored in the cache without storing the mask in the cache, and wherein, in a case that a rasterization result of the rendering object has been cached, it is determined whether the mask has been cached, and, in a case that the mask is determined not to have been cached, it is determined whether an overlap exists between the rendering object and a background image, and, in a case that the overlap is determined not to exist, the image is extracted from the cache and the extracted image is rendered and, in a case that the overlap is determined to exist, a mask is generated and the generated mask is cached before extracting the image and mask from the cache and rendering the extracted image on a portion of the extracted mask so that the background image remains on a portion other than the portion of the mask.

22. A non-transitory computer-readable storage medium storing a program for causing a rendering apparatus to perform a method comprising:

determining whether a rasterization result of a rendering object is cached;

generating an image and a mask for the image from the rendering object and storing the generated image and the generated mask in a cache;

in a case that it is determined that the rasterization result of the rendering object is cached, extracting an image and a mask from the cache and rendering the extracted image on a portion of the extracted mask so that a background image remains on a portion other than the portion of the mask; and determining whether there is an overlap between the rendering object and a background object, wherein, in a case that it is determined that the rasterization result of the rendering object is not cached and there is an overlap between the rendering object and the background object, the image and the mask for the image are generated from the rendering object and the generated image and the generated mask are stored in the cache, wherein, in a case that it is determined that the rasterization result of the rendering object is not cached and there is no overlap between the rendering object and the background object, the image is generated from the rendering object without generating the mask for the image from the rendering object and the generated image is stored in the cache without storing the mask in the cache, and wherein, in a case that a rasterization result of the rendering object has been cached, it is determined whether the mask has been cached, and, in a case that the mask is determined not to have been cached, it is determined whether an overlap exists between the rendering object and a background image, and, in a case that the overlap is determined not to exist, the image is extracted from the cache and the extracted image is rendered and, in a case that the overlap is determined to exist, a mask is generated and the generated mask is cached before extracting the image and mask from the cache and rendering the extracted image on a portion of the extracted mask so that the background image remains on a portion other than the portion of the mask.

* * * * *